United States Patent
Krishnan et al.

(10) Patent No.: US 10,705,949 B2
(45) Date of Patent: Jul. 7, 2020

(54) EVALUATION OF LIBRARY TEST SUITES USING MUTATION TESTING

(71) Applicant: Oracle International Corporation, Redwood Shores, CA (US)

(72) Inventors: Padmanabhan Krishnan, Brisbane (AU); Rebecca O'Donoghue, Brisbane (AU); Jerome Loh, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 133 days.

(21) Appl. No.: 15/803,111

(22) Filed: Nov. 3, 2017

(65) Prior Publication Data
US 2019/0138433 A1 May 9, 2019

(51) Int. Cl.
*G06F 11/00* (2006.01)
*G06F 11/36* (2006.01)

(52) U.S. Cl.
CPC ...... *G06F 11/3692* (2013.01); *G06F 11/3664* (2013.01); *G06F 11/3684* (2013.01); *G06F 11/3688* (2013.01)

(58) Field of Classification Search
CPC ............. G06F 11/3692; G06F 11/3664; G06F 11/3684; G06F 11/3688; G06F 21/577
See application file for complete search history.

(56) References Cited

U.S. PATENT DOCUMENTS

| | | | | |
|---|---|---|---|---|
| 7,574,681 | B2 * | 8/2009 | Hampton | G06F 11/3688 716/106 |
| 9,473,522 | B1 * | 10/2016 | Kotler | H04L 63/1433 |
| 10,044,747 | B2 * | 8/2018 | Liu | G06F 21/577 |

OTHER PUBLICATIONS

Alexander, R.T. et al., "Mutation of Java Objects", Proceedings of the 13th International Symposium on Software Reliability Engineering (ISSRE '02), Nov. 12-15, 2002 (11 pages).
Bertolino, A. et al., "XACMUT: XACML 2.0 Mutants Generator", IEEE Sixth International Conference on Software Testing, Verification and Validation Workshops (ICSTW), Luxembourg, Mar. 18-22, 2013, pp. 28-33 (6 pages).
Chevalley, P. et al., "A Mutation Analysis Tool for Java Programs", International Journal on Software Tools for Technology Transfer (STTT), vol. 5, Issue 1, pp. 90-103, Nov. 2003 (14 pages).
Coles, H. et al., PIT: A Practical Mutation Testing Tool for Java (Demo), Proceedings of the 25th International Symposium on Software Testing and Analysis (ISSTA 2016) Saarbruken, Germany, Jul. 18-20, 2016, pp. 449-452 (4 pages).
Delahaye, M. et al., "A Comparison of Mutation Analysis Tools for Java", 13th International Conference on Quality Software, Najing, China, Jul. 29-30, 2013, pp. IEEE Xplore pp. 187-195 (9 pages).

(Continued)

*Primary Examiner* — Philip Guyton
(74) *Attorney, Agent, or Firm* — Ferguson Braswell Fraser Kubasta (57) ABSTRACT

A method for evaluating a test suite for a software library includes generating a mutated software library by adding a fault to the software library, while the software library is used by a testing tool to evaluate a test suite. The method further includes loading the mutated software library, then executing a test in the test suite on the mutated software library to obtain a test result. The method further includes analyzing the test result.

15 Claims, 9 Drawing Sheets

(56) References Cited

OTHER PUBLICATIONS

Jia, Y. et al., "An Analysis and Survey of the Development of Mutation Testing", IEEE Transactions on Software Engineering, vol. 37, No. 5, Sep. 2011, pp. 649-678 (30 pages).

Loise, T. et al., "Towards Security-aware Mutation Testing", IEEE International Conference on Software Testing, Verification and Validation Workshops (ICSTW) Tokyo, Japan, Mar. 13-17, 2017 (6 pages).

Martin, E. et al., "A Fault Model and Mutation Testing of Access Control Policies", Proceedings of the 16th International Conference on World Wide Web, Banff, Alberta, Canada, May 8-12, 2007, pp. 667-676 (10 pages).

Thomas, T., et al., "A Study of Interactive Code Annotation for Access Control Vulnerabilities", IEEE Symposium on Visual Languages and Human-Centric Computing (VL/HCC), Atlanta, GA, USA, Oct. 18-22, 2015 (5 pages).

Oudinet, J. et al., "Evaluation of ASLan Mutation Operators", International Conference on Tests and Proofs, Lecture Notes in Computer Science book series (LNCS) vol. 7942, pp. 178-196 (19 pages).

Le Traon, Y. et al., "Testing Security Policies: Going Beyond Functional Testing", IEEE 18th International Symposium on Software Reliability Engineering, Trollhattan, Sweden, Nov. 5-9, 2007 (10 pages).

\* cited by examiner

EVALUATION OF LIBRARY TEST SUITES USING MUTATION TESTING

BACKGROUND

Mutation testing is a fault-based testing technique that can be used to evaluate the quality of a test suite. The idea is to deliberately seed faults into the original program to create a set of faulty programs, and check whether the test suite can distinguish the behavior of each of the faulty program against the original program. Mutation testing has been used to evaluate software testing at application level, but rarely at the software library level.

Because the size of the software library itself and the number of tests associated with the software library are both very large, a manual approach is not feasible and a suitable tool to automate the evaluation is helpful. One particular challenge that arises from automation is that mutating the software library may affect the behavior of testing tools built upon the software library being tested.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for evaluating a test suite for a software library. The method includes generating a mutated software library by adding a fault to the software library, while the software library is used by a testing tool to evaluate a test suite. The method further includes loading the mutated software library, then executing a test in the test suite on the mutated software library to obtain a test result. The method further includes analyzing the test result.

In general, in one aspect, one or more embodiments relate to a system for evaluating a test suite for a software code library. The system includes a memory comprising the software library. The system further includes a computer processor executing a testing tool for causing the computer processor to perform the followings instructions. The instructions generate a mutated software library by adding a fault to the software library, while the software library is used by a testing tool to evaluate a test suite. The instructions further load the mutated software library, then execute a test in the test suite on the mutated software library to obtain a test result. The instructions further analyze the test result.

In general, in one aspect, one or more embodiments of the invention relate to a non-transitory computer readable medium for evaluating a test suite for a software library comprising computer readable program code that perform the following. The computer readable program code generate a mutated software library by adding a fault to the software library, while the software library is used by a testing tool to evaluate a test suite. The computer readable program code further load the mutated software library, then execute a test in the test suite on the mutated software library to obtain a test result. The computer readable program code further analyze the test result.

Other aspects of the invention will be apparent from the following description and the appended claims.

BRIEF DESCRIPTION OF DRAWINGS

FIGS. 9.1 and 9.2 show computing systems in accordance with one or more embodiments of the invention.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the invention, the various disclosed embodiments may be combined in virtually any manner. All combinations are contemplated herein.

In general, embodiments are directed to an evaluation of test suites for a software library using mutation testing. In particular, one or more embodiments are directed to a method to ensure that the mutations are applied only to the software library but not to the associated testing tools that are using the software library under test.

In one or more embodiments, mutation testing is a fault-based testing technique that can be used to evaluate the quality of a test suite. The idea is to deliberately seed faults into the original program to create a set of faulty programs called mutants, and check whether the test suite is able to distinguish the behavior of each of the mutant against the original program.

In one or more embodiments, a mutant is considered to be killed if one or more of the tests in the suite are able to distinguish the behavior of the mutant against the behavior of the original program. The quality of the test suite is measured as its ability to detect faults in the mutants. For example, a test suite that detects almost all of the seeded mutants is likely to be much more useful than one that can kill only a small number.

In one or more embodiments, the evaluation result is the output of the evaluation program for the test suite. The evaluation result contains the number of mutants generated, the number of mutants that are killed, the mutation kill ratio, as well as the time taken to run the tests. The mutation kill ratio, also called mutation score, is the ratio of mutants killed to the total number of mutants generated. The mutation score is the measurement of the effectiveness (or quality) of the test suites, and mutation score reflects the adequacy of the test suite.

Figure 1:
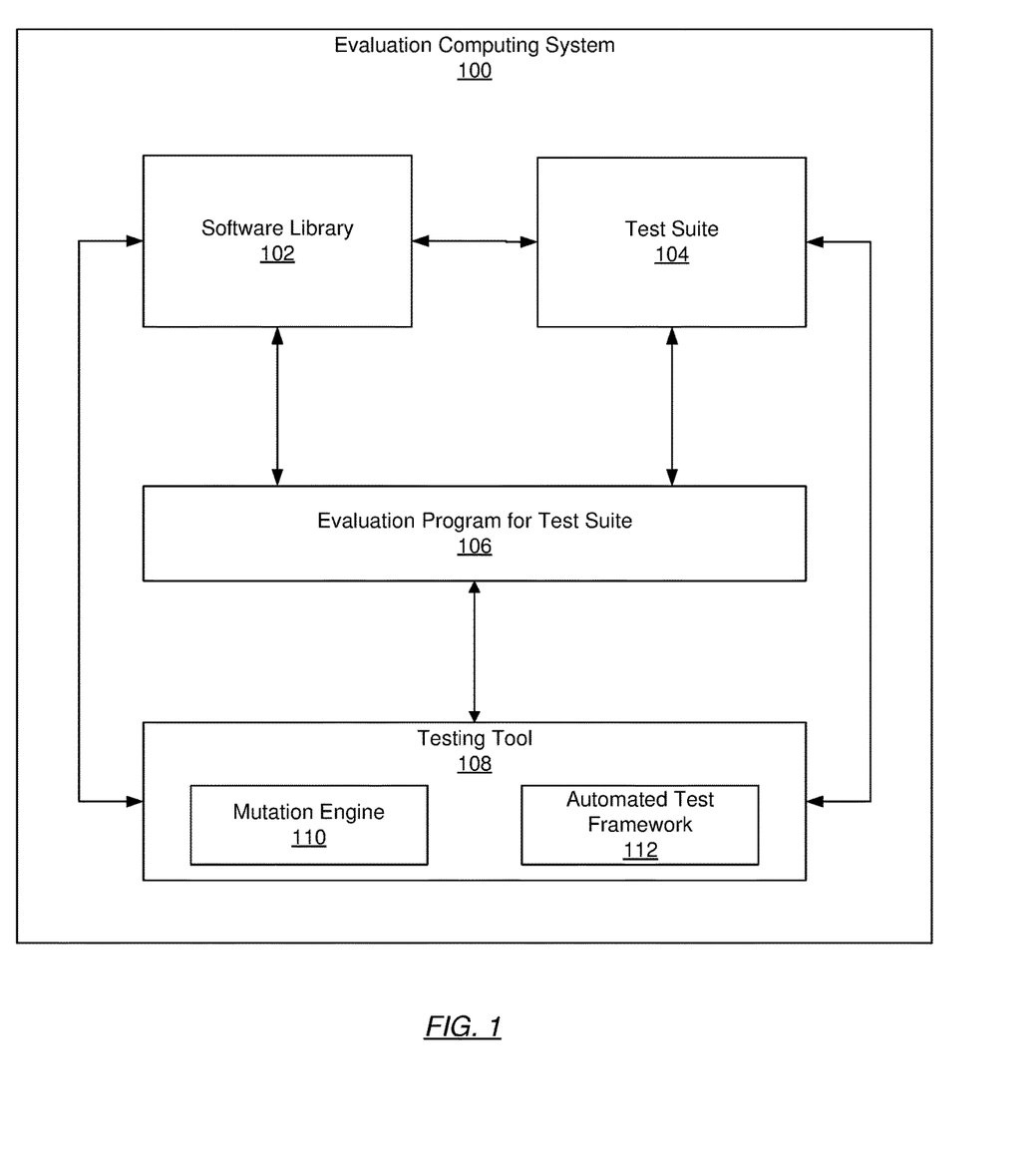
FIG. 1 shows a diagram of a system in accordance with one or more embodiments of the invention.
Figure 91:
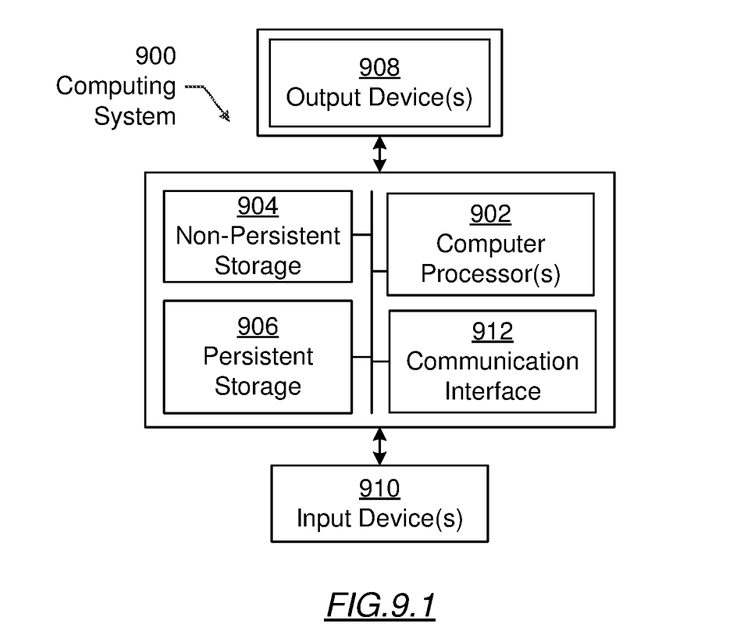
Figure 92:
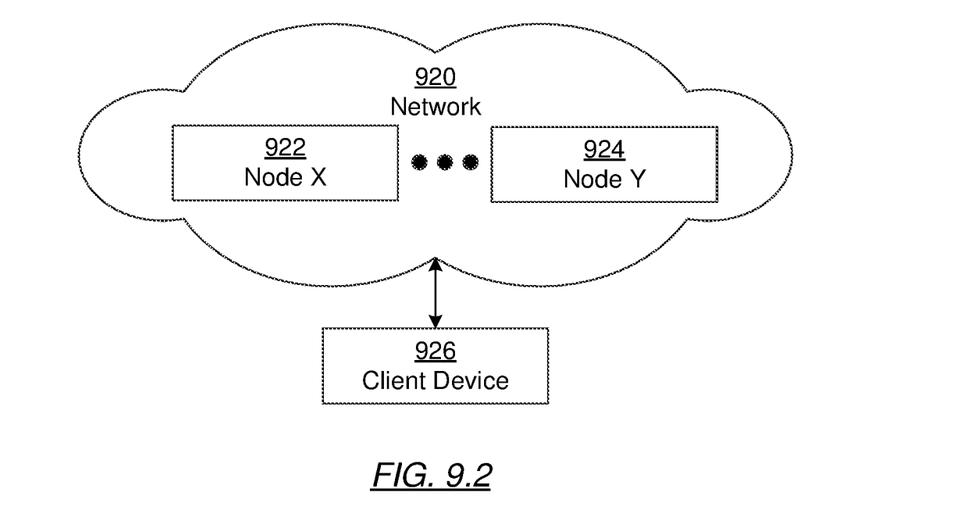

FIG. 1 shows a schematic diagram of an evaluation computing system (100) in accordance with one or more embodiments. The evaluation computing system (100) in FIG. 1 may correspond to the computing system shown in FIGS. 9.1 and 9.2. As shown in FIG. 1, the evaluation computing system (100) includes a software library (102), a test suite (104), an evaluation program for test suite (106), a testing tool (108) consisting of a mutation engine (110) and an automated test framework (112).

In one or more embodiments, the software library (102) is the program under test. The software library (102) is being tested and it is seeded with faults, which are known as mutations. Each copy of the software library that is mutated in this fashion is known as a mutant.

In one or more embodiments, the software library (102) can be in any computer programming languages. For example, the software library (102) can be programmed using Java, C#, or other computer programming languages.

In one or more embodiments, the test suite (104) aims to detect errors in the software library (102) and it is the target for evaluation. The test suite (104) is executed on each mutant of the software library (102).

In one or more embodiments, the evaluation program for test suite (106) includes functionality to measure the quality of the test suite (104) while running on the software library (102).

In one or more embodiments, the evaluation program for the software library test suite (106) is integrated with the testing tool (108) that is also using the software library (102).

In one or more embodiments, the software library (102), the evaluation program for test suite (108), the mutation engine (110), and the automated test framework (112) are collections of source code including various software components. That is, the software library (102) and application programs (106, 110, and 112) may be collections of computer instructions written in a human-readable programming language. The software library (102) and application programs (106, 110, and 112) may be transformed by a compiler into binary machine code. Compiled machine code may then be executed by a processor in order to execute the software components generated from the software library (102) and/or application programs (106, 110, and 112).

While FIG. 1 shows a configuration of components, other configurations may be used without departing from the scope of the invention. For example, various components may be combined to create a single component. As another example, the functionality performed by a single component may be performed by two or more components.

Figure 2:
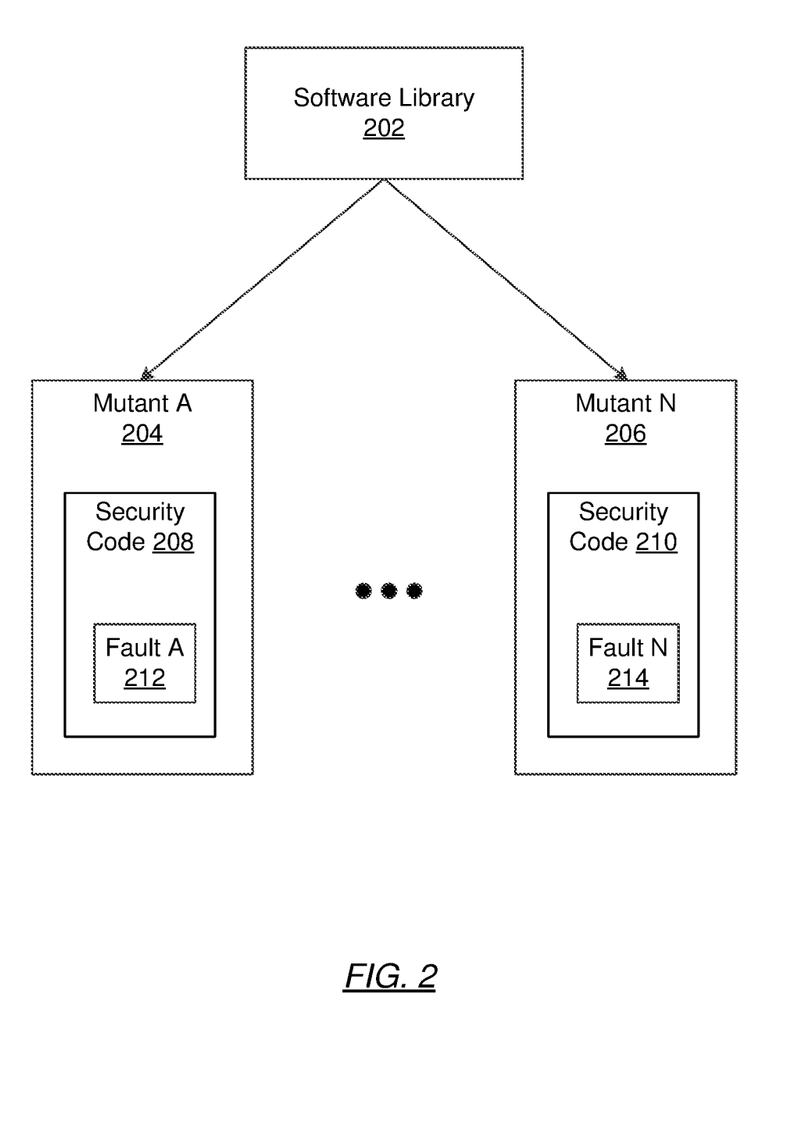
FIG. 2 shows a block diagram of the concept of a software library and its mutated versions in accordance with one or more embodiments of the invention.

FIG. 2 shows a block diagram of a software library and its mutated versions in accordance with one or more embodiments. Each mutated version has a fault in the security code. A mutated version of the software library (202) is called a mutant (e.g., Mutant A (204), Mutant N (206)). The software library (202) is being tested, and by way of example, it is seeded with security-related faults (e.g., Fault A (212), Fault N (214)).

A set of mutants, i.e. mutant A (204) . . . mutant N (206), is a set of faulty programs that are generated by mutation operators. Mutant A (204) contains the fault A (212) within security code (208) of the software library (202), while mutant N (206) contains the fault N (214) within security code (210) of the original software library (202).

Figure 3:
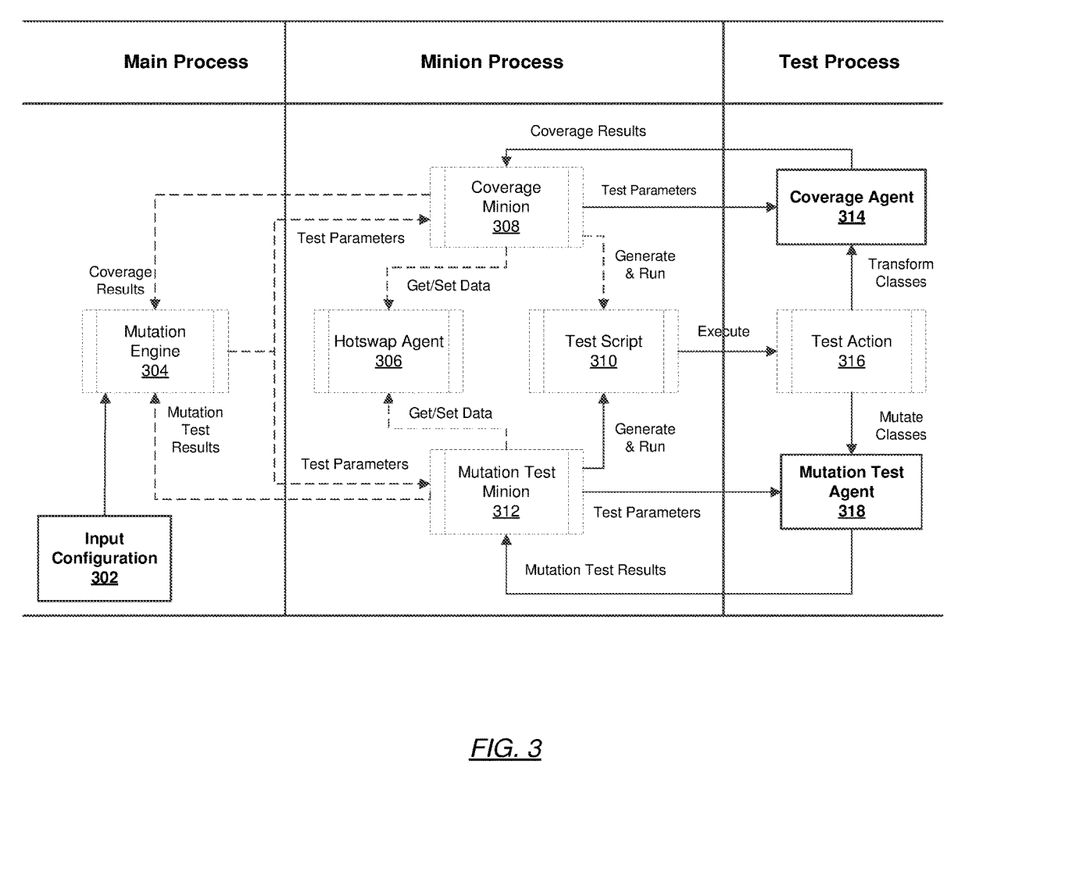
FIG. 3 shows an integrated software architecture of the evaluation computing system in accordance with one or more embodiments of the invention.

FIG. 3 shows an integrated software architecture of the evaluation computing system (100 in FIG. 1) in accordance with one or more embodiments. The components in FIG. 3 may be mapped to the components in FIG. 1. The components shown with solid lines in FIG. 3 belong to the evaluation program for test suite (106 in FIG. 1). The components shown with dotted lines in FIG. 3 belong to the testing tool (108 in FIG. 1).

As shown in FIG. 3, the evaluation program for test suite (106 in FIG. 1) include the input configuration (302), the coverage agent (314) and the mutation test agent (318). The mutation engine (304) includes the mutation test minion (312), the coverage minion (308), and the hotswap agent (306). The automated test framework (112 in FIG. 1) includes the test script (310) and the test action (316).

In one or more embodiments, the mutation engine (304) finds the relevant tests and only executes the relevant tests for each mutant. In one or more embodiments of the invention, the automated test framework (112 in FIG. 1), also called test harness, runs all the tests automatically in the test suite in a sequential fashion.

Since the testing tool (the mutation engine (304) and the test harness) also use the software library, mutating the software library could affect the test tool's behavior especially when mutated classes are dynamically loaded. Therefore, it is necessary to mutate at a correct time so that the classes used by the testing tool are not modified, rather only the classes from the software library under test are modified.

In one or more embodiments, the coverage agent (314) and the mutation test agent (318) control how the mutations happen. The mutation test agent (318) controls how to mutate and when to mutate.

In one or more embodiments, the concept of coverage may be used to identify the relevant tests. The coverage minion (308) computes coverage to identify and run the set of tests relevant to the mutations.

In one or more embodiments, the input configuration (302) is in the form of a text file that stores in the input configuration data. The input configuration data contains information about the software library under test, the test suites to be evaluated, the options for the mutation engine and the test harness, the mutation testing operators that will be used, and the parameters for mutation testing operators.

In one or more embodiments, the mutation generation phase is driven by the input configuration (302). The mutation engine uses the values specified in the configuration to derive the relevant test parameters which are then used to drive the mutation test minion (312). The mutation operators are parametric in that each operator can generate a number of specific mutations depending on the parameters used.

In the context of security testing, the security-specific mutation operators ensure that the mutants generated have potentially different security requirements from the original code. The mutation operators can be classified as either narrowing or widening the set of permissions. The narrowing operators either check for more permissions or remove permissions that are available to the code. The widening operators either check for fewer permissions or grant more permissions to the code. For example, deleting a security call in the software library is a form of widening because it is as if the application has been granted the elided permission. As another example, replacing a permission in a security call with AllPermission represents narrowing because we are checking for more permissions than before.

FIGS. 4, 5, 6, and 7 show flowcharts in accordance with one or more embodiments of the invention. The steps of the flowcharts may be performed by the system described above with reference to FIG. 1. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. Accordingly, the scope of the invention should not be considered limited to the specific arrangement of steps shown in FIGS. 4, 5, 6, and 7.

Figure 4:
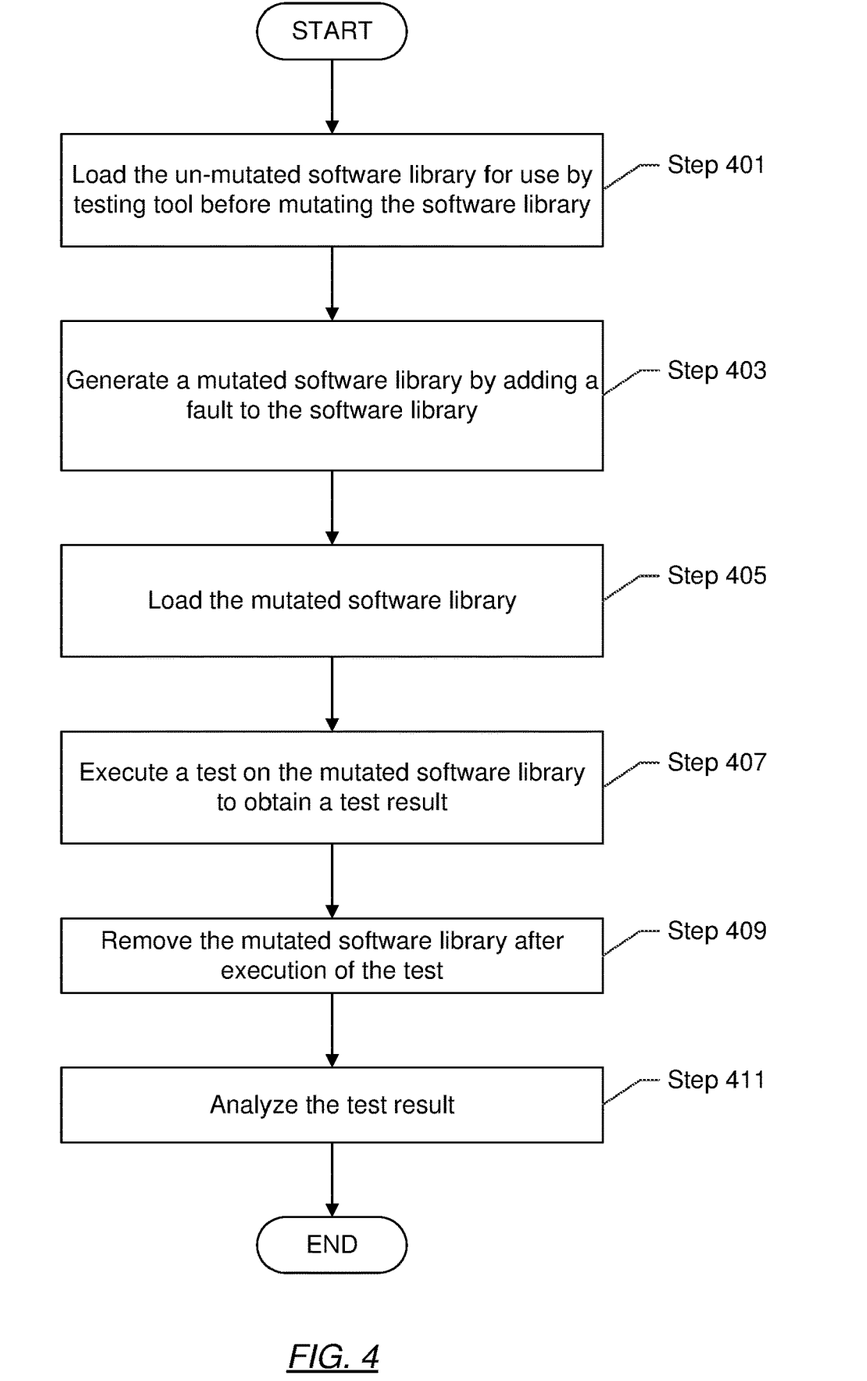
FIGS. 4, 5, 6, and 7 show flowcharts in accordance with one or more embodiments of the invention.

FIG. 4 shows a flowchart that depicts a main process for evaluating a test suite for a software library using mutation testing. In Step 401, the un-mutated software library is loaded for use by the testing tool first before the software library is mutated. In one or more embodiments, in order for the mutation not to affect the behavior of the testing tool, the software library needs to be loaded by the testing tool first before the software library is mutated, then the mutation operators are applied only when a test begins and the mutations are removed once the testing has ended. Therefore, the classes loaded by the mutation testing tools are not mutated, and only the testing and evaluation processes use the mutated classes.

In Step 403, a mutated software library (i.e. mutant) is generated by adding a fault to the software library, in accordance with one or more embodiments. Generating the mutant includes choosing the mutation operators, then applying these mutation operators to seed faults in the software library. In Step 405, the mutated software library generated in Step 403 is loaded for mutation testing, in accordance with one or more embodiments.

In Step 407, a test is performed on the mutated software library to obtain a test result, in accordance with one or more embodiments. In Step 409, the mutated software library is removed after execution of the test, in accordance with one or more embodiments. In Step 411, the test result is analyzed, in accordance with one or more embodiments. The test result is analyzed as discussed above and further described below.

Figure 5:
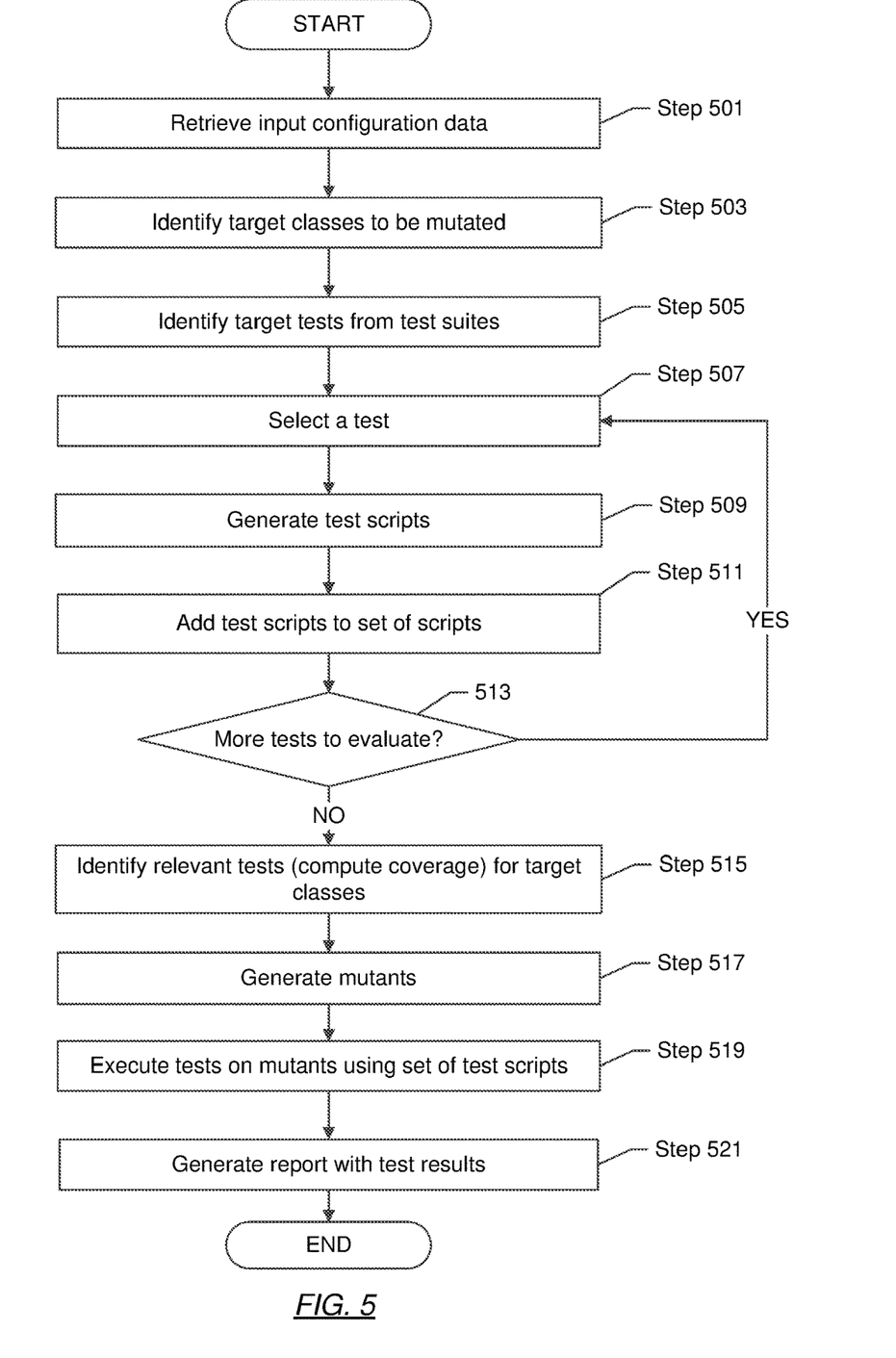

FIG. 5 shows a flow chart that shows the overall approach for evaluating a test suite using mutation testing. In Step 501, the input configuration data is retrieved from an input configuration file. In Step 503, a set of target classes to be mutated are identified. In Step 505, a set of target tests are identified from the test suites. In Step 507, a test is selected from the identified set of target tests. In one or more embodiments, the selection of the test is automated.

In Step 509, a set test scripts are generated for the selected test. The generation of the test scripts is performed by the test harness. In Step 511, the test scripts generated in step 509 are appended to an existing set of scripts. In Step 513, a determination is made whether more tests exist to evaluate. If more tests exist to evaluate, then the flow goes back to Step 507 to select the next test. Otherwise, Step 515 below is performed.

In Step 515, the test scripts are used to compute the coverage, i.e. to identify the relevant tests for the target classes. In Step 517, a set of mutants of the software library are generated by the mutation engine. The default procedure in the mutation engine is extended by the evaluation program for test suite to create mutants. For example, in the context of security testing, the key extension is that mutations involving adding or changing permissions are generated multiple times, one for each permission from the input configuration file.

In Step 519, the relevant tests are executed on each mutant by the test harness using the test scripts. In Step 521, the evaluation results are computed and the evaluation report is generated.

Figure 6:
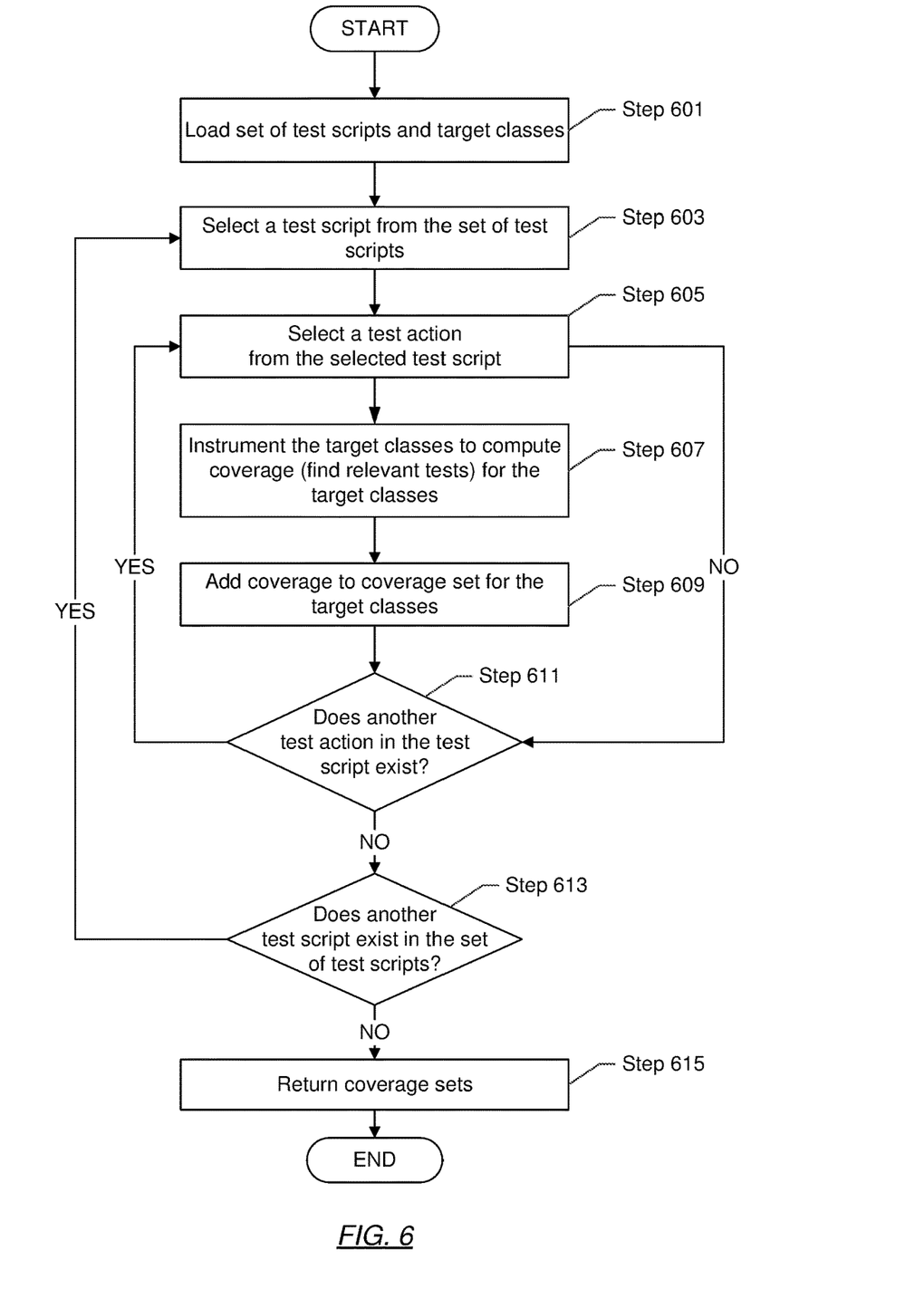

FIG. 6 shows a flowchart that depicts, in more detail, Step 515 in FIG. 5, i.e. the process for finding the relevant tests (computing coverage) for the target classes.

In Step 601, the set of test scripts and the target classes are loaded. In Step 603, a test script from the set of test scripts is selected. In Step 605, a test action is selected from the selected test script. In Step 607, the target classes are instrumented to compute the coverage, i.e. find the relevant tests for the target classes. This is performed by the mutation engine of the testing tool.

In Step 609, the coverage is added to a coverage set for the target classes. The coverage set contains a plurality of pairs, with each pair relating a mutated class to a corresponding test operating on a mutated class. In Step 611, a determination is made whether another test action exists in the test script. If another test action exists in the test script, the flow returns to Step 605 to select the next test action. Otherwise, Step 613 below is performed.

In Step 613, a determination is made whether another test script exists in the set of test scripts. If another test script exists, the flow returns to Step 603 to select the next test script. Otherwise, all the test scripts have already been run, and the coverage sets are returned in Step 615.

Figure 7:
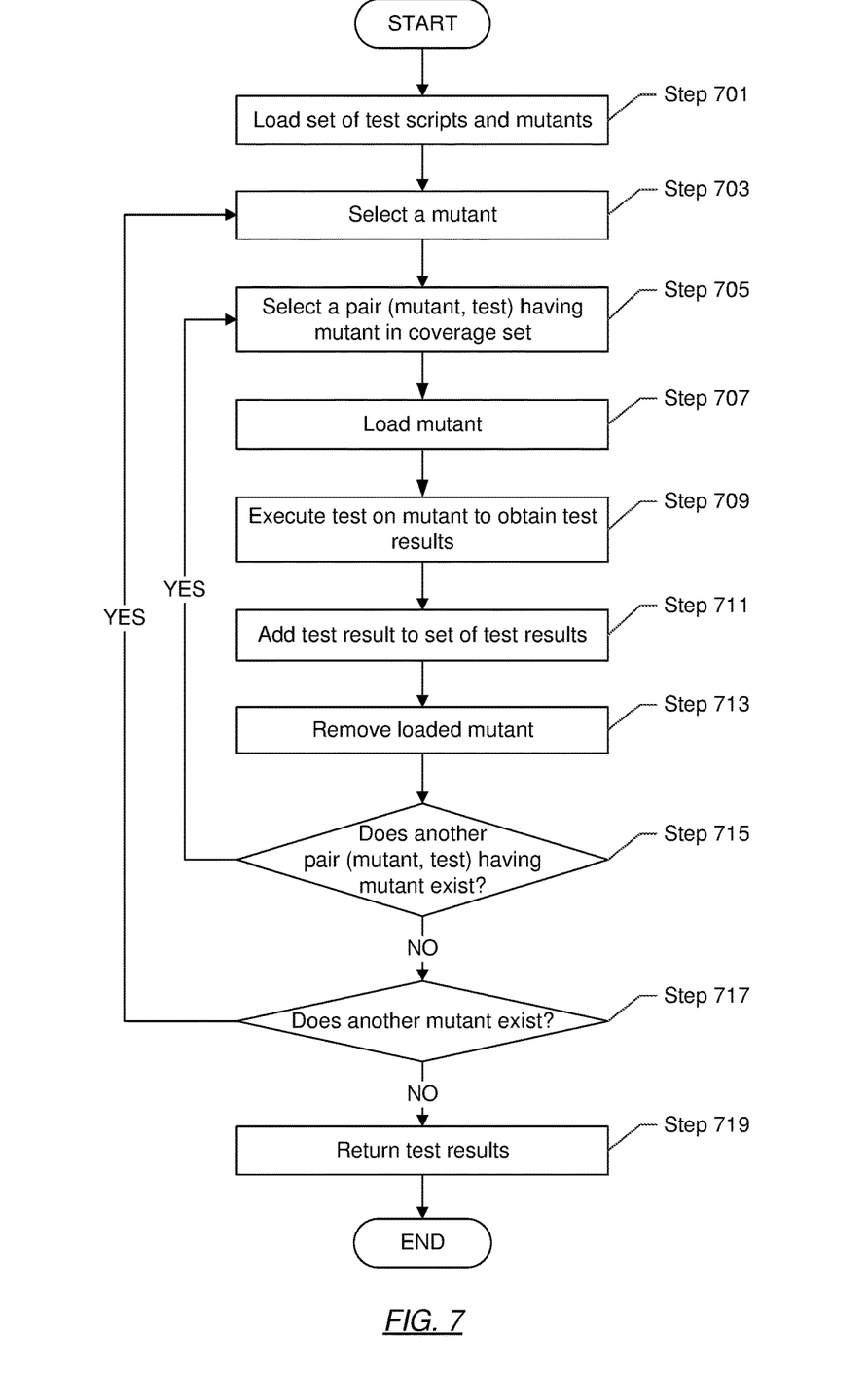

FIG. 7 shows a flowchart that depicts Step 519 in FIG. 5, i.e. the process for executing mutation tests using the set of test scripts. Before this step, the mutants have been already generated, and are ready to be run by the tests in the test suite.

In Step 701, the set of test scripts and the mutants are loaded. In Step 703, a mutant is selected. In Step 705, a pair of mutant and test having the mutant in the coverage set is selected. The coverage set is provided by Step 515. In Step 707, a mutant is loaded.

In Step 709, the corresponding test is executed on the loaded mutant, and test results are obtained. In Step 711, the test results are added to a set of test results. In Step 713, the loaded mutant is removed prior to executing a subsequent pair. In Step 715, a determination is made whether another pair (mutant and test) exists. If another pair exists, the flow returns to Step 705 to select the next pair. Otherwise, Step 717 is performed. In Step 717, a determination is made whether another mutant exists. If another mutant exists, the flow returns to Step 703 to select the next mutant. Otherwise, all mutants are already run, and the test results are returned in Step 719.

Figure 8:
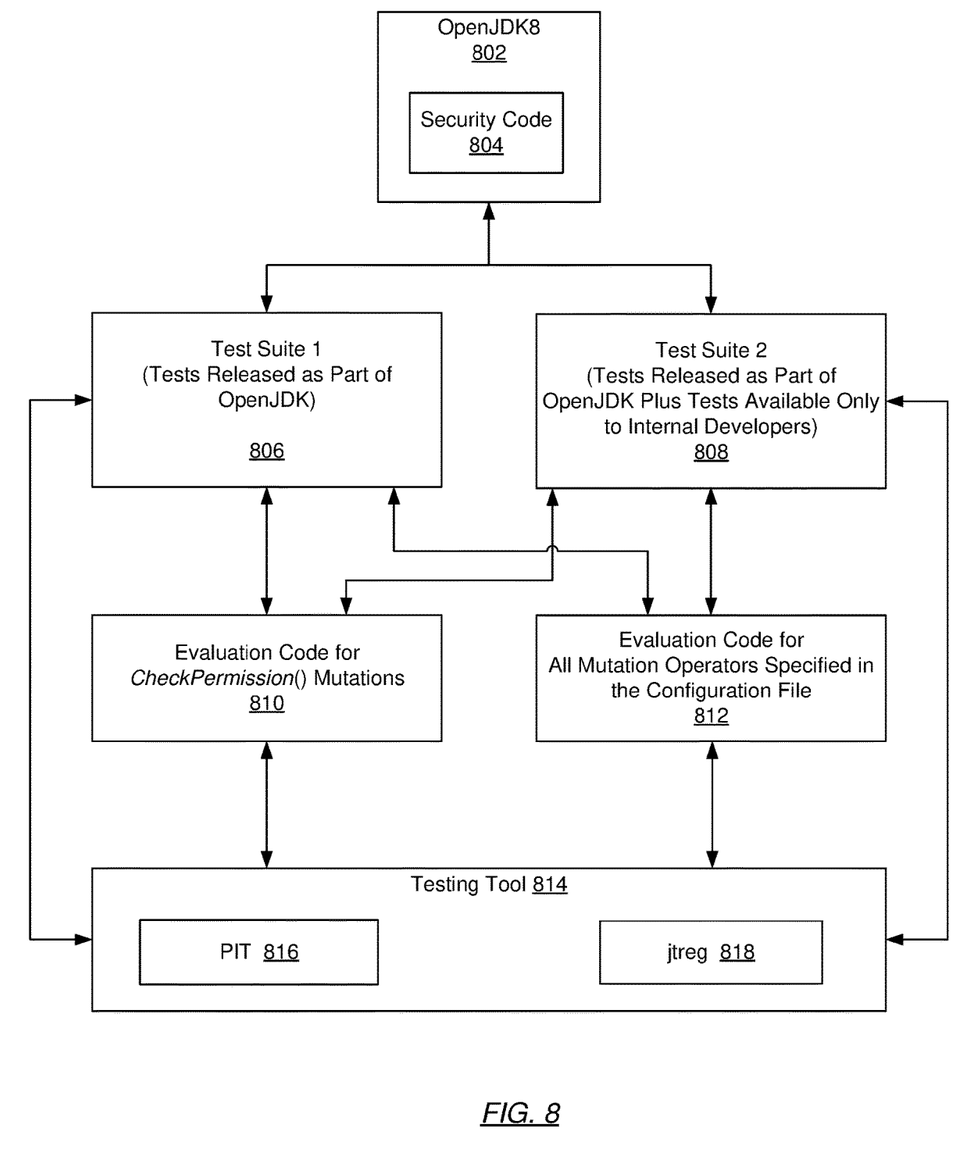
FIG. 8 shows an example of evaluating testing suites of Java code library in accordance with one or more embodiments of the invention.

The following example is for explanatory purposes only and not intended to limit the scope of the invention. FIG. 8 shows an example of evaluating testing suites of Java code library in accordance with one or more embodiments. In this example, the security code (804) of a Java code library called OpenJDK8 (802) is the code to be tested, and two test suites are chosen to be evaluated. Test Suite 1 (806) includes the tests that are released as part of OpenJDK8 (802). Test Suite 2 (808) includes the tests that are released as part of OpenJDK8 (802) and the tests that are available only to internal developers. The testing tool (814) used in this example includes the Java mutation engine PIT (816) and the test harness (i.e. the automated testing framework) jtreg (818).

The test suite 1 (806) and the test suite 2 (808) are evaluated by the evaluation program using the security-related mutation operator checkPermission( ) (810). Specifically, the possibilities are deleting the call or replacing the permission parameter with AllPermission.

The test suite 1 (806) and the test suite 2 (808) are also evaluated by the evaluation program using all the mutation operators specified in the configuration file (812).

Embodiments of the invention may be implemented on a computing system. Any combination of mobile, desktop, server, router, switch, embedded device, or other types of hardware may be used. For example, as shown in FIG. 9.1, the computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), and numerous other elements and functionalities.

The computer processor(s) (902) may be an integrated circuit for processing instructions. For example, the computer processor(s) may be one or more cores or micro-cores of a processor. The computing system (900) may also include one or more input devices (910), such as a touchscreen, keyboard, mouse, microphone, touchpad, electronic pen, or any other type of input device.

The communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the computing system (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (900) in FIG. 9.1 may be connected to or be a part of a network. For example, as shown in FIG. 9.2, the network (920) may include multiple nodes (e.g., node X (922), node Y (924)). Each node may correspond to a computing system, such as the computing system shown in FIG. 9.1, or a group of nodes combined may correspond to the computing system shown in FIG. 9.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (900) may be located at a remote location and connected to the other elements over a network.

Although not shown in FIG. 9.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (922), node Y (924)) in the network (920) may be configured to provide services for a client device (926). For example, the nodes may be part of a cloud computing system. The nodes may include functionality to receive requests from the client device (926) and transmit responses to the client device (926). The client device (926) may be a computing system, such as the computing system shown in FIG. 9.1. Further, the client device (926) may include and/or perform all or a portion of one or more embodiments of the invention.

The computing system or group of computing systems described in FIGS. 9.1 and 9.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 9.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 9.1, while performing one or more embodiments of the invention, may perform data comparison. Data comparison may be used to compare two or more data values (e.g., A, B). For example, one or more embodiments may determine whether $A>B$, $A=B$, $A\,!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 9.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 9.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 9.1 and the nodes and/or client device in FIG. 9.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for evaluating a test suite for a software library comprising:
    loading the software library comprising a first class, wherein the first class is an un-mutated class;
    generating a mutated software library by adding a first fault to the first class of the software library to obtain a second class, wherein the second class is a mutated class,
        wherein the first class of the software library is used by a testing tool to evaluate a test suite,
        wherein the first class of the software library comprises a first security call comprising a check for a first permission,
        wherein generating the mutated software library further comprises modifying the first security call to further comprise a check for a second permission to obtain a modified security call, and
        wherein the first fault is the modified security call;
    loading the mutated software library;
    executing, using the mutated class, a test in the test suite on the mutated software library to obtain a test result; and
    analyzing the test result.

2. The method of claim 1, further comprising:
    removing the mutated class after executing the test.

3. The method of claim 1, further comprising:
    computing a coverage set comprising a plurality of pairs, each pair relating a mutated class of the software library to a corresponding test of the test suite operating on the mutated class;
    executing each pair of a plurality of pairs in the coverage set, wherein executing a pair comprises:
        loading the corresponding mutated class,
        executing, on the corresponding mutated class, the corresponding test to obtain a test result, and
        removing the corresponding mutated class prior to executing a subsequent pair.

4. The method of claim 1, further comprising:
    generating, using the software library, a plurality of test scripts prior to loading the mutated software library.

5. The method of claim 1, further comprising:
    identify a plurality of target classes of the software library;
    identify a plurality of tests; and
    generating a plurality of mutated software libraries based on the plurality of target classes and the plurality of tests.

6. The method of claim 1, wherein generating the mutated software library further comprises adding a second fault to the software library, wherein the second fault is a second security call being deleted in the software library.

7. The method of claim 1, wherein generating the mutated software library further comprises adding a second fault to the software library, wherein the second fault is a second security call comprising a modified parameter with a wider scope than an original parameter in the software library.

8. A system for evaluating a test suite for a software library comprising:
    memory comprising the software library comprising a first class, wherein the first class is an un-mutated class; and
    a computer processor executing a testing tool for causing the computer processor to:

load the software library,
generate a mutated software library by adding a first fault to the first class of the software library to obtain a second class, wherein the second class is a mutated class,
  wherein the first class of the software library is used by a testing tool to evaluate a test suite,
  wherein the first class of the software library comprises a first security call comprising a check for a first permission,
  wherein generating the mutated software library further comprises modifying the first security call to further comprise a check for a second permission to obtain a modified security call, and
  wherein the first fault is the modified security call;
load the mutated software library;
execute, using the mutated class, a test in the test suite on the mutated software library to obtain a test result; and
analyze the test result.

9. The system of claim 8, wherein the testing tool further causes the computer processor to:
  compute a coverage set comprising a plurality of pairs, each pair relating a mutated class of the software library to a corresponding test of the test suite operating on the mutated class;
  execute each pair of a plurality of pairs in the coverage set, wherein executing a pair comprises:
    loading the corresponding mutated class,
    executing, on the corresponding mutated class, the corresponding test to obtain a test result, and
    removing the corresponding mutated class prior to executing a subsequent pair.

10. The system of claim 8, wherein generating the mutated software library further comprises adding a second fault to the software library, wherein the second fault is a second security call being deleted in the software library.

11. The system of claim 8, wherein generating the mutated software library further comprises adding a second fault to the software library, wherein the second fault is a second security call comprising a modified parameter with a wider scope than an original parameter in the software library.

12. A non-transitory computer readable medium for evaluating a test suite for a software library comprising computer readable program code for:
  loading the software library comprising a first class, wherein the first class is an un-mutated class;
  generating a mutated software library by adding a first fault to the first class of the software library to obtain a second class, wherein the second class is a mutated class,
    wherein the first class of the software library is used by a testing tool to evaluate a test suite,
    wherein the first class of the software library comprises a first security call comprising a check for a first permission,
    wherein generating the mutated software library further comprises modifying the first security call to further comprise a check for a second permission to obtain a modified security call, and
    wherein the first fault is the modified security call;
  loading the mutated software library;
  executing, using the mutated class, a test in the test suite on the mutated software library to obtain a test result; and
  analyzing the test result.

13. The non-transitory computer readable medium of claim 12, further comprising computer readable program code for:
  computing a coverage set comprising a plurality of pairs, each pair relating a mutated class of the software library to a corresponding test of the test suite operating on the mutated class;
  executing each pair of a plurality of pairs in the coverage set, wherein executing a pair comprises:
    loading the corresponding mutated class,
    executing, on the corresponding mutated class, the corresponding test to obtain a test result, and
    removing the corresponding mutated class prior to executing a subsequent pair.

14. The non-transitory computer readable medium of claim 12, wherein generating the mutated software library further comprises adding a second fault to the software library, wherein the second fault is a second security call being deleted in the software library.

15. The non-transitory computer readable medium of claim 12, wherein generating the mutated software library further comprises adding a second fault to the software library, wherein the second fault is a second security call comprising a modified parameter with a wider scope than an original parameter in the software library.

* * * * *